(12) United States Patent
Chen

(10) Patent No.: US 11,333,634 B2
(45) Date of Patent: May 17, 2022

(54) SIGNAL SENSING MODULE AND ULTRASONIC PROBE USING THE SAME

(71) Applicant: INDUSTRIAL TECHNOLOGY RESEARCH INSTITUTE, Hsinchu (TW)

(72) Inventor: Kuo-Tso Chen, Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 76 days.

(21) Appl. No.: 17/078,300

(22) Filed: Oct. 23, 2020

(65) Prior Publication Data

US 2021/0123889 A1    Apr. 29, 2021

Related U.S. Application Data

(60) Provisional application No. 62/924,707, filed on Oct. 23, 2019.

(30) Foreign Application Priority Data

Jun. 5, 2020 (TW) .................................. 109119078

(51) Int. Cl.
*G01N 29/24* (2006.01)
*H04B 11/00* (2006.01)
(Continued)

(52) U.S. Cl.
CPC ....... *G01N 29/245* (2013.01); *G01N 29/0654* (2013.01); *G01N 29/07* (2013.01);
(Continued)

(58) Field of Classification Search
CPC .. G01N 29/245; G01N 29/0654; G01N 29/07; G01N 29/04; G01N 29/36;
(Continued)

(56) References Cited

U.S. PATENT DOCUMENTS 5,195,046 A * 3/1993 Gerardi ................. B64D 15/20
                                                              73/659
8,098,000 B2   1/2012   Okuda et al.
(Continued)

FOREIGN PATENT DOCUMENTS

CN     206546583 U    10/2017
TW       575024 A     2/2004
(Continued)

OTHER PUBLICATIONS

Taiwanese Office Action and Search Report for Taiwanese Application No. 109119078, dated May 4, 2021.

*Primary Examiner* — Suman K Nath
(74) *Attorney, Agent, or Firm* — Birch, Stewart, Kolasch & Birch, LLP

(57) ABSTRACT

A signal sensing module includes a substrate, a sensing electrode, a piezoresistive material layer and a sensing circuit. The substrate has a surface. The sensing electrode is disposed on the substrate and is exposed from the surface. The piezoresistive material layer is formed on the surface and covers the sensing electrode. The piezoresistive material layer has a resistance value. The sensing circuit is disposed in the substrate and adapted to sense a change of resistance value when a pressure wave passes through the piezoresistive material layer.

24 Claims, 7 Drawing Sheets

(51) Int. Cl.
*G01N 29/06* (2006.01)
*G01N 29/07* (2006.01)

(52) U.S. Cl.
CPC ........ H04B 11/00 (2013.01); *G01N 2291/011* (2013.01); *G01N 2291/023* (2013.01); *G01N 2291/101* (2013.01)

(58) Field of Classification Search
CPC ......... G01N 29/2437; G01N 2291/011; G01N 2291/023; G01N 2291/101; G01N 2291/044; H04B 11/00
See application file for complete search history.

(56) References Cited

U.S. PATENT DOCUMENTS

| | | | |
|---|---|---|---|
| 9,127,999 B2 | 9/2015 | Tsuruno et al. | |
| 9,221,171 B2 | 12/2015 | Sugiura et al. | |
| 2001/0035695 A1* | 11/2001 | Kadota | H03H 9/176 310/313 R |
| 2018/0074638 A1* | 3/2018 | Chiang | G06F 3/045 |

FOREIGN PATENT DOCUMENTS

| | | |
|---|---|---|
| TW | I644244 B | 12/2018 |
| TW | I663417 B | 6/2019 |

\* cited by examiner

SIGNAL SENSING MODULE AND ULTRASONIC PROBE USING THE SAME

This application claims the benefit of U.S. Provisional application Ser. No. 62/924,707, filed Oct. 23, 2019, the disclosure of which is incorporated by reference herein in its entirety, and claims the benefit of Taiwan application Serial No. 109119078, filed Jun. 5, 2020, the subject matter of which is incorporated herein by reference.

FIELD OF THE DISCLOSURE

The disclosure relates to a sensing module and a probe using the same, and more particularly to a signal sensing module and an ultrasonic probe using the same.

BACKGROUND OF THE DISCLOSURE

A signal sensing module of a conventional ultrasonic probe usually uses piezoelectric materials, such as Lead Zirconate Titanate (PZT), to sense reflected signal of ultrasonic wave reflected from a to-be-measured object. However, the piezoelectric sensing technology is difficult to be combined with the integrated circuit manufacturing process, and it is also difficult to make a two-dimensional sensing array. Therefore, how to propose a technology that could improve the aforementioned conventional problems is one of the goals of the industry's efforts.

SUMMARY OF THE DISCLOSURE

The present disclosure is to provide a signal sensing module and an ultrasonic probe using the same.

In one embodiment of the disclosure, a signal sensing module is provided. The signal sensing module includes a substrate, a sensing electrode, a first piezoresistive material layer and a sensing circuit. The substrate has a surface. The sensing electrode is disposed on the substrate and exposed from the surface. The first piezoresistive material layer is formed on the surface, covers the sensing electrode and has a resistance value. The sensing circuit is disposed on the substrate and configured to sense a change of resistance value when a pressure wave passes through the first piezoresistive material layer.

In another embodiment of the disclosure, an ultrasonic probe is provided. The ultrasonic probe includes a signal transmitting module and a signal sensing module. The signal transmitting module is configured to emit an ultrasonic signal. The signal sensing module is configured to sense reflected signal of the ultrasonic signal reflected from a to-be-measured object. The signal sensing module includes a substrate, a sensing electrode, a first piezoresistive material layer and a sensing circuit. The substrate has a surface. The sensing electrode is disposed on the substrate and exposed from the surface. The first piezoresistive material layer is formed on the surface, covers the sensing electrode and has a resistance value. The sensing circuit is disposed on the substrate and configured to sense a change of resistance value when a pressure wave passes through the first piezoresistive material layer.

Numerous objects, features and advantages of the disclosure will be readily apparent upon a reading of the following detailed description of embodiments of the disclosure when taken in conjunction with the accompanying drawings. However, the drawings employed herein are for the purpose of descriptions and should not be regarded as limiting.

BRIEF DESCRIPTION OF THE DRAWINGS

The above objects and advantages of the disclosure will become more readily apparent to those ordinarily skilled in the art after reviewing the following detailed description and accompanying drawings, in which.

DETAILED DESCRIPTION OF PREFERRED EMBODIMENTS

Figure 1:
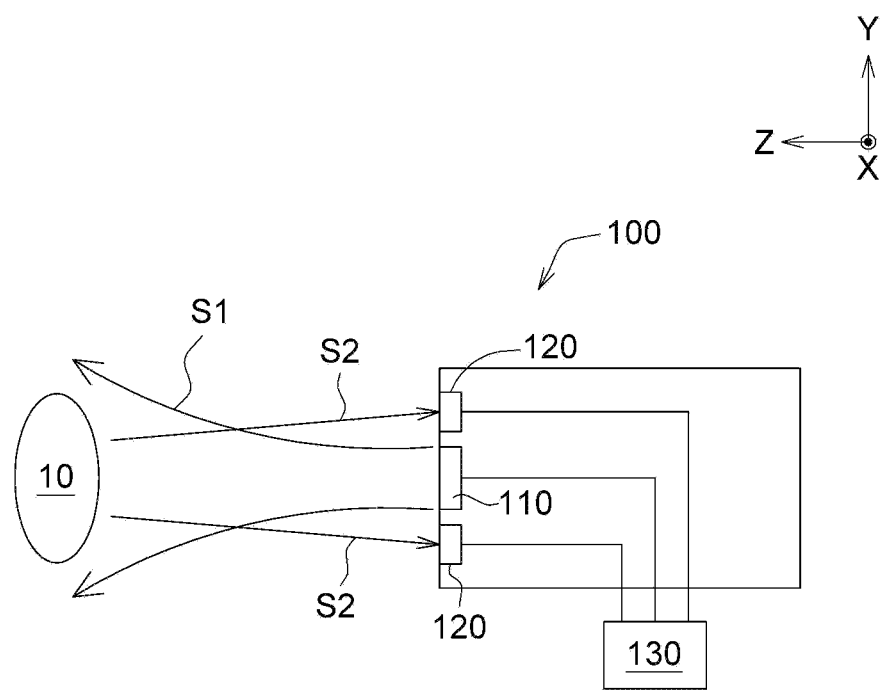
FIG. 1 is a schematic diagram of an ultrasonic probe according to an embodiment of the disclosure.
Figure 2A:
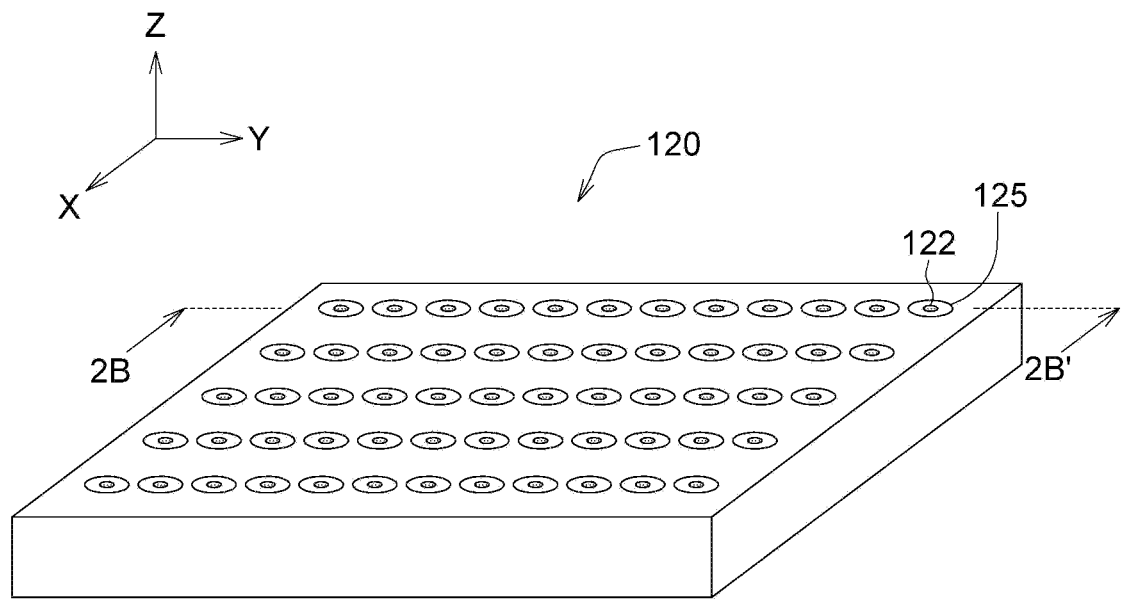
FIG. 2A is a signal sensing module of the ultrasonic probe of FIG. 1.
Figure 2B:
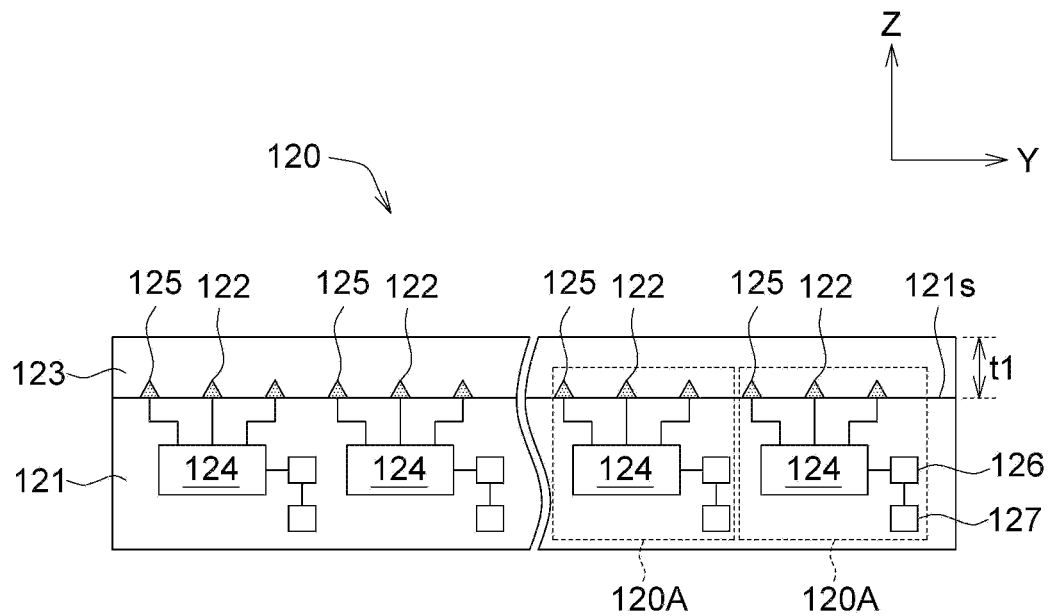
FIG. 2B is a cross-sectional view of the signal sensing module of FIG. 2A along direction 2B-2B'.

Referring to FIGS. 1 and 2A to 2B, FIG. 1 is a schematic diagram of an ultrasonic probe 100 according to an embodiment of the disclosure, FIG. 2A is a signal sensing module 120 of the ultrasonic probe 100 of FIG. 1, and FIG. 2B is a cross-sectional view of the signal sensing module 120 of FIG. 2A along direction 2B-2B'.

The ultrasonic probe 100 includes a signal transmitting module 110 and at least one signal sensing module 120. The signal transmitting module 110 is adapted to emit an ultrasonic signal S1, and the signal sensing module 120 is adapted to sense a reflected signal S2 that is the ultrasonic signal S1 reflected from the to-be-measured object. The signal transmitting module 110 and the signal sensing module 120 are electrically connected to a controller 130. The controller 130 could be disposed in the ultrasound probe 100 to become a sub-element of the ultrasound probe 100, or could be disposed in a machine (not shown) outside the ultrasound probe 100. The controller 130 could control the signal transmitting module 110 to emit the ultrasonic signal S1 to the to-be-measured object 10, wherein the ultrasonic signal S1 is reflected from the to-be-measured object 10 to become the reflected signal S2. The reflected signal S2 is reflected to the signal sensing module 120 and is received and sensed by the signal sensing module 120. The controller 130 could obtain structural information of at least one dimension of the to-be-measured object 10 according to the reflected signal S2. The aforementioned structural information is, for example, a surface contour image of the to-be-measured object 10, a shallow structural image, and/or a deep structural image.

For example, when the signal transmitting module 110 emits the ultrasonic signal with short wavelength (high frequency), the ultrasonic probe 100 could sense surface profile or shallow structure of the to-be-measured object 10. When the signal transmitting module 110 emits the ultrasonic signal with long-wavelength (low-frequency), the ultrasonic probe 100 could sense the deep structure of the to-be-measured object 10. The signal transmitting module 110 is, for example, a PZT type array transmitting module.

In the present embodiment, as shown in FIG. 1, the number of signal sensing modules 120 is two, which are respectively located on opposite two sides of the signal transmitting module 110. In another embodiment, the number of signal sensing modules 120 could be one, but the number of signal sensing modules 120 is not limited to those listed. Compared with one signal sensing module 120, the ultrasonic probe 100 including two signal sensing modules 120 has higher sensing accuracy and sensing resolution. In other embodiments, the number of the signal sensing module 120 could be multiple, wherein the signal sensing module 120 could be separated and circularly surround (as viewed from the −Z axis in FIG. 1) the signal transmitting module 110 to obtain structural information for higher measurement accuracy and sensing resolution.

As shown in FIGS. 2A and 2B, the signal sensing module 120 includes a substrate 121, at least one sensing electrode 122, a first piezoresistive material layer 123, at least one sensing circuit 124 and at least one reference electrode 125.

The substrate 121 has a surface 121s. The sensing electrode 122 is disposed on the substrate 121 and exposed from the surface 121s. The first piezoresistive material layer 123 is formed on the surface 121s, covers the sensing electrode 122 and has a resistance value. The sensing circuit 124 is disposed in the substrate 121 and is adapted for sensing the change in resistance value when the reflected signal S2 (pressure wave) passes through the first piezoresistive material layer 123. The ultrasonic probe 100 could obtain the structural information of the to-be-measured object 10 according to the change of the resistance value.

As shown in FIG. 2B, the signal sensing module 120 further includes at least one analog-to-digital converter (ADC) 126 and at least one storage 127, wherein the analog-to-digital converter 126 is electrically connected to the sensing circuit 124 to convert the reflected signal S2 that is analog signal into a digital signal. The storage 127 is electrically connected to the analog-to-digital converter 126 to store voltage value based on the reflected signal S2.

As shown in FIG. 2B, the signal sensing module 120 includes a plurality of sensing units 120A, and these sensing units 120A are formed in the substrate 121. Each sensing unit 120A includes one sensing electrode 122, one reference electrode 125, one sensing circuit 124, one analog-to-digital converter 126 and one storage 127. In an embodiment, each sensing unit 120A could sense the structural information of different parts of the to-be-measured object 10, and the controller 130 could obtain the voltage value of the reflected signal S2 stored in the storage 127 of each sensing unit 120A and calculate (or treat) the voltage value to obtain structural information of at least one dimension of the to-be-measured object 10.

The substrate 121 is, for example, a wafer. In terms of manufacturing process, for example, a semiconductor manufacturing process could be used to form the sensing unit 120A in the substrate 121. The foregoing semiconductor manufacturing process is, for example, a semiconductor manufacturing process that could form an integrated circuit such as coating, electroplating, lithography etching, etc. Compared with the conventional piezoelectric sensing module that is difficult to combine with an integrated circuit, the sensing electrode 122, the sensing circuit 124, the reference electrode 125, the analog-to-digital converter 126, the storage 127 or other related integrated circuit structures are laid out together in the substrate 121 due to the signal sensing module 120 of the embodiment of the present disclosure could be formed using an integrated circuit process, and the first piezoresistive material layer 123 could also be integrated in the integrated circuit process. In detail, the elements in the signal sensing module 120 could be disposed in one-dimensional array or two-dimensional array on surface of the substrate 121. In an embodiment, the first piezoresistive material layer 123 could be made of a material including, for example, carbon-containing polymer, metal-containing particulate polymer, etc., but it is not limited thereto.

As shown in FIG. 2A, the signal sensing module 120 is, for example, a multi-dimensional sensing module. For example, several sensing units 120A are disposed in two dimensions. Some of the sensing units 120A are disposed in rows along the X axis, and the other of the sensing units 120A are disposed in rows along the Y axis. As a result, the aforementioned sensing unit 120A could sense the two-dimensional image signal of the to-be-measured object 10 in the XY plane, and the time difference of the reflected signal S2 sensed by each sensing unit 120A indicates dimensional signal in the Z-axis of the to-be-measured object 10. As a result, the controller 130 could obtain the three-dimensional structure information of the to-be-measured object 10 according to the reflected signal S2 sensed by each sensing unit 120A. In addition, the signal sensing module 120 of the embodiment of the present disclosure could sense the reflected signal S2 from the to-be-measured object 10 once by the aforementioned sensing unit 120A without scanning, so even if the to-be-measured object 10 (for example, fetus in the belly of pregnant woman) changes dynamically, the instantaneous structure information of the to-be-measured object 10 could be obtained accurately and quickly.

In another embodiment, the signal sensing module 120 could also be one-dimensional sensing module. For example, all the sensing units 120A of the signal sensing module 120 could be disposed along one axis, such as disposed in single row along the X axis or the Y axis. As a result, the aforementioned sensing unit 120A could sense the one-dimensional image signal of the to-be-measured object 10 along the X axis or the Y axis. In the present embodiment, the ultrasonic probe 100 could scan the to-be-measured object 10 along another axis, and after integration, the two-dimensional image signal of the to-be-measured object 10 along the XZ plane or YZ plane could also be obtained.

As shown in FIG. 2B, the sensing electrode 122 and the reference electrode 125 are disposed on the substrate 121, wherein the reference electrode 125 is disposed adjacent to the sensing electrode 122. The sensing electrode 122 is, for example, metal electrode, such as a copper electrode. The reference electrode 125 is, for example, a metal electrode, such as a copper electrode. As shown in FIG. 2A, the reference electrode 125 surround the sensing electrode 122 to reduce the interference of noise on the sensing electrode 122. In detail, at least one part of one reference electrode 125 is located between the two adjacent sensing electrodes 122, and thus it could prevent the signals of the two adjacent sensing electrodes 122 from being interfering with each other. In the present embodiment, the reference electrode 125 has a ring shape, for example, a closed ring shape, which surrounds the entire sensing electrode 122 to produce a full-circumferential (360 degrees) interference shielding effect on the sensing electrode 122. In another embodiment, the reference electrode 125 could also be shaped in an open ring shape, that is, the reference electrode 125 includes a plurality of separately arranged sub-reference electrodes (not shown), which surround the sensing electrode 122, and thus it could prevent the signals of several sensing electrodes 122 from being interfering with each other.

As shown in FIG. 2B, the signal sensing module 120 includes the first piezoresistive material layer 123 with single layer. A thickness t1 of the first piezoresistive material layer 123 is related to current path distribution of the reflected signal S2 in the first piezoresistive material layer 123 (for example, the simulated current distribution between the sensing electrode 122 and the reference electrode 125), and the type of piezoresistive material is determined (or selected) according to the current path distribution. For example, when the thickness t1 of the first piezoresistive material layer 123 is less than a thickness value (for example, 0.3 mm), the current path distribution is biased toward lateral distribution (for example, in the XY plane), and thus material which is more (or the most) sensitive to lateral resistance value sensing is selected for the first piezoresistive material layer 123. Conversely, when the thickness t1 of the first piezoresistive material layer 123 is greater than the thickness value (for example, 0.5 mm), the current path distribution is biased toward the longitudinal distribution (for example, in the Z axis), and thus material which is more (or the most) sensitive to longitudinal resistance value sensing is selected for the first piezoresistive material layer 123.

In another embodiment, when the thickness t1 of the first piezoresistive material layer 123 is less than the aforementioned thickness value, the current path distribution could also be biased toward the longitudinal distribution, and correspondingly the material which is more (or the most) sensitive to longitudinal resistance value sensing is selected for the first piezoresistive material layer 123. When the thickness t1 of the first piezoresistive material layer 123 is greater than the thickness value, the current path distribution could also be biased toward the lateral distribution, and correspondingly the material which is more (or the most) sensitive to lateral resistance value sensing is selected for the first piezoresistive material layer 123.

In summary, the embodiments of the present disclosure do not limit the thickness and/or type of the first piezoresistive material layer 123, as long as the material could be selected to match (or conform to) the direction in which the first piezoresistive material layer 123 is more (or most) sensitive to resistance sensing.

Figure 3A:
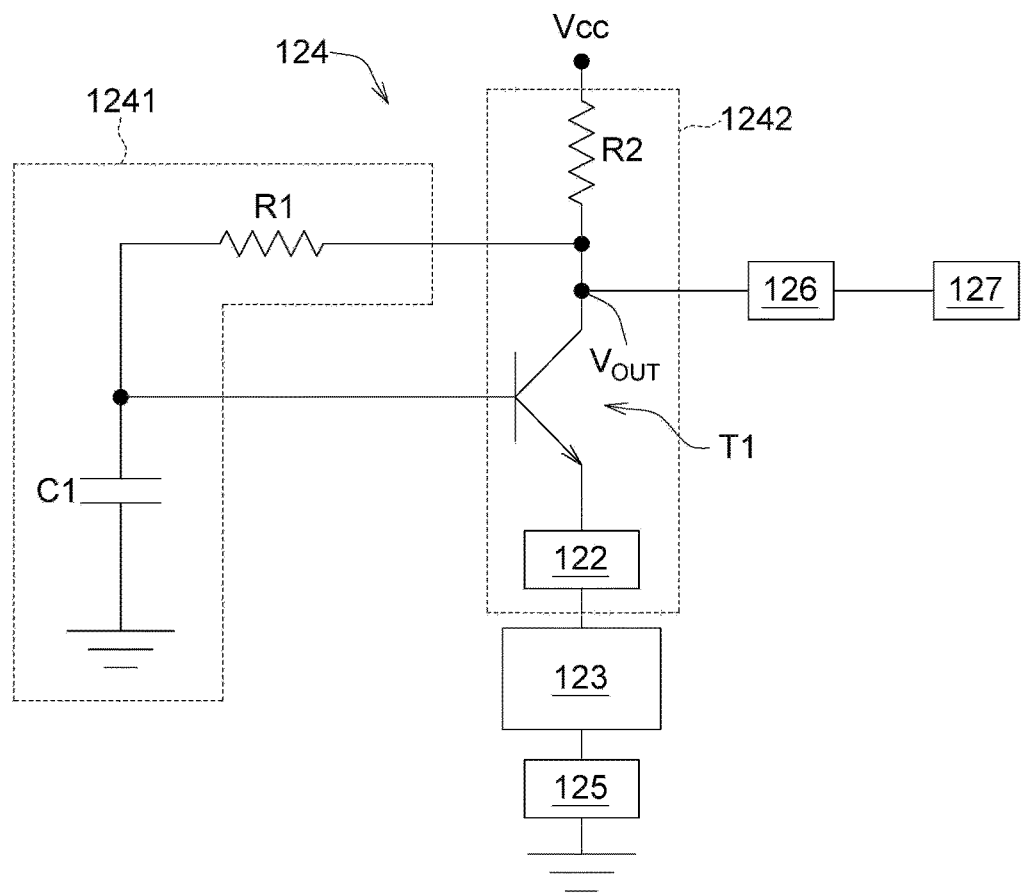
FIG. 3A is a circuit block diagram of an embodiment of the sensing circuit of FIG. 2B.
Figure 3B:
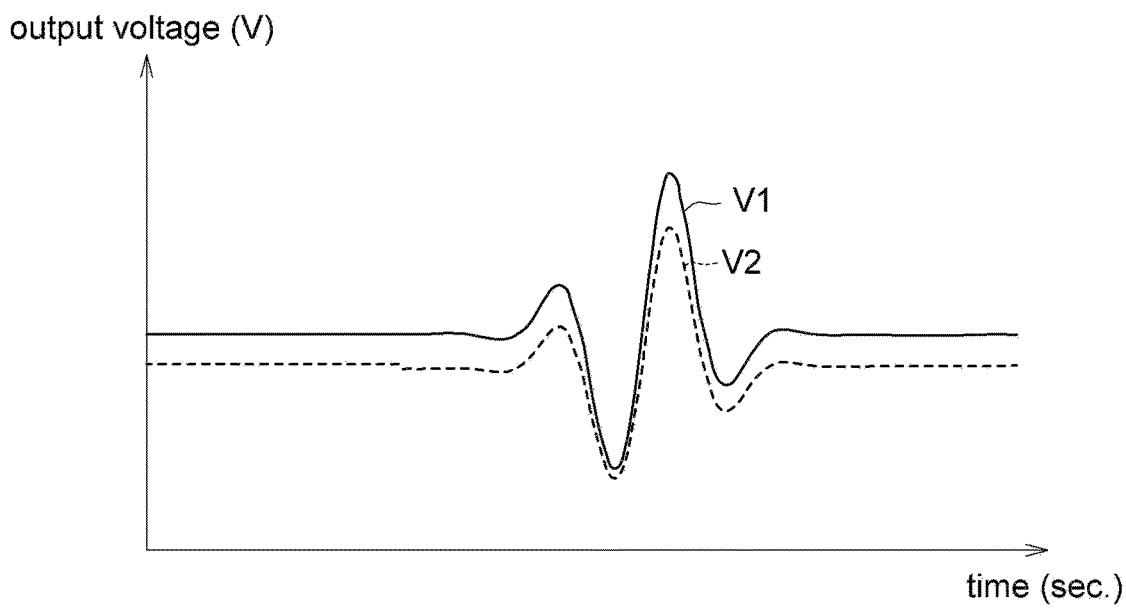
FIG. 3B is a diagram view of relationship curve between the output voltage of the output voltage node of the sensing circuit of FIG. 3A versus time.

Referring to FIGS. 3A and 3B, FIG. 3A is a circuit block diagram of an embodiment of the sensing circuit 124 of FIG. 2B, and FIG. 3B is a diagram view of relationship curve between the output voltage of the output voltage node $V_{OUT}$ of the sensing circuit 124 of FIG. 3A versus time.

As shown in FIG. 3A, the sensing circuit 124 includes at least one transistor T1, a feedback circuit 1241 (includes a capacitor C1 and a first resistor R1), a second resistor R2, a control voltage node $V_{CC}$ and the output voltage node $V_{OUT}$. In the present embodiment, the transistor T1 is, for example, a Bipolar Junction Transistor (BJT), such as NPN-type BJT or PNP-type BJT, or a field-effect transistor (FET), such as NMOS-type FET or PMOS-type FET. The sensing electrode 122 is electrically coupled to an emitter of the transistor T1. The resistance value of the first piezoresistive material layer 123 could be measured through the output voltage node $V_{OUT}$. When the signal sensing module 120 receives the reflected signal S2, the reflected signal S2 will cause the resistance value of the first piezoresistive material layer 123 to change. This resistance change could be measured through the output voltage node $V_{OUT}$. In addition, the control voltage node $V_{CC}$ could provide a voltage of 5 volts (V), for example.

As shown in FIG. 3A, the feedback circuit (or low-pass filter circuit) 1241 of the sensing circuit 124 includes the first resistor R1 and the capacitor C1, wherein a terminal of the first resistor R1 is electrically coupled to the capacitor C1 and base of the transistor T1, another terminal of the first resistor R1 is electrically coupled to collector of the transistor T1, and the reference electrode 125 is electrically coupled to ground potential. Since the feedback is affected by time constant of the first resistor R1 and the capacitor C1, only the feedback signal of the low-frequency is balanced, and the sensing for the high-frequency reflected signal S2 by the sensing circuit 124 is not be affected. In detail, when the low-frequency signal (for example, when the ultrasonic probe 100 is pressed, the thickness of the first piezoresistive material layer 123 becomes uneven, or the resistance distribution of the first piezoresistive material layer 123 itself becomes uneven), the low-frequency signal will be conducted to the ground potential along the feedback circuit 1241, and thus it does not affect the output value of the output voltage node $V_{OUT}$. In other words, the low-frequency signal does not affect the voltage output value of the sensing circuit 124 to the reflected signal S2 with high-frequency. In an embodiment, the first resistor R1 in FIG. 3A is, for example, 500 KΩ, and the capacitor C1 is, for example, 0.2 nF.

As shown in FIG. 3A, the sensing circuit 124 further includes a detection circuit 1242, which includes the second resistor R2, the transistor T1, and the sensing electrode 122. When the reflected signal S2 (pressure wave with high-frequency) acts on the sensing circuit 124, the reflected signal S2 passes through the detection circuit 1242, and the resistance value of the first piezoresistive material layer 123 could be obtained through the output value of the output voltage node $V_{OUT}$. In an embodiment, the second resistor R2 in FIG. 3A is, for example, 33 KΩ.

As shown in FIG. 3B, the horizontal axis represents time, and the longitudinal axis represents the output voltage of the output voltage node $V_{OUT}$. The curve V1 represents the relationship between the output voltage of the output voltage node $V_{OUT}$ versus time when the first piezoresistive material layer 123 is applied with the reflected signal S2 of 1 MHz has the resistance value of 1.38±0.15 KΩ, and the curve V2 represents the relationship the output voltage of the output voltage node $V_{OUT}$ versus time when the first piezoresistive material layer 123 is applied with the reflected signal S2 of 1 MHz has the resistance value of 0.69±0.073 KΩ. Different resistance values could simulate a situation where the resistance distribution of the first piezoresistive material layer 123 itself becomes uneven or the thickness of the first piezoresistive material layer 123 becomes uneven when the ultrasonic probe 100 is pressed. As shown in the figure, the trend of the output voltages shown by the curves V1 and V2 is consistent, while it is unrelated to uneven distribution of the resistance of the first piezoresistive material layer 123 (or the uneven distribution of the resistance of the first piezoresistive material layer 123 does not affect the consistency). It can be seen that the sensing circuit 124 in FIG. 3A could eliminate the influence of the uneven distribution of the resistance value of the first piezoresistive material layer 123, such that the sensed signal (the output voltage of the output voltage node $V_{OUT}$) is almost the reflected signal S2 with high-frequency, and thus it could increase the accuracy of detecting structural information of the to-be-measured object 10.

Figure 4A:
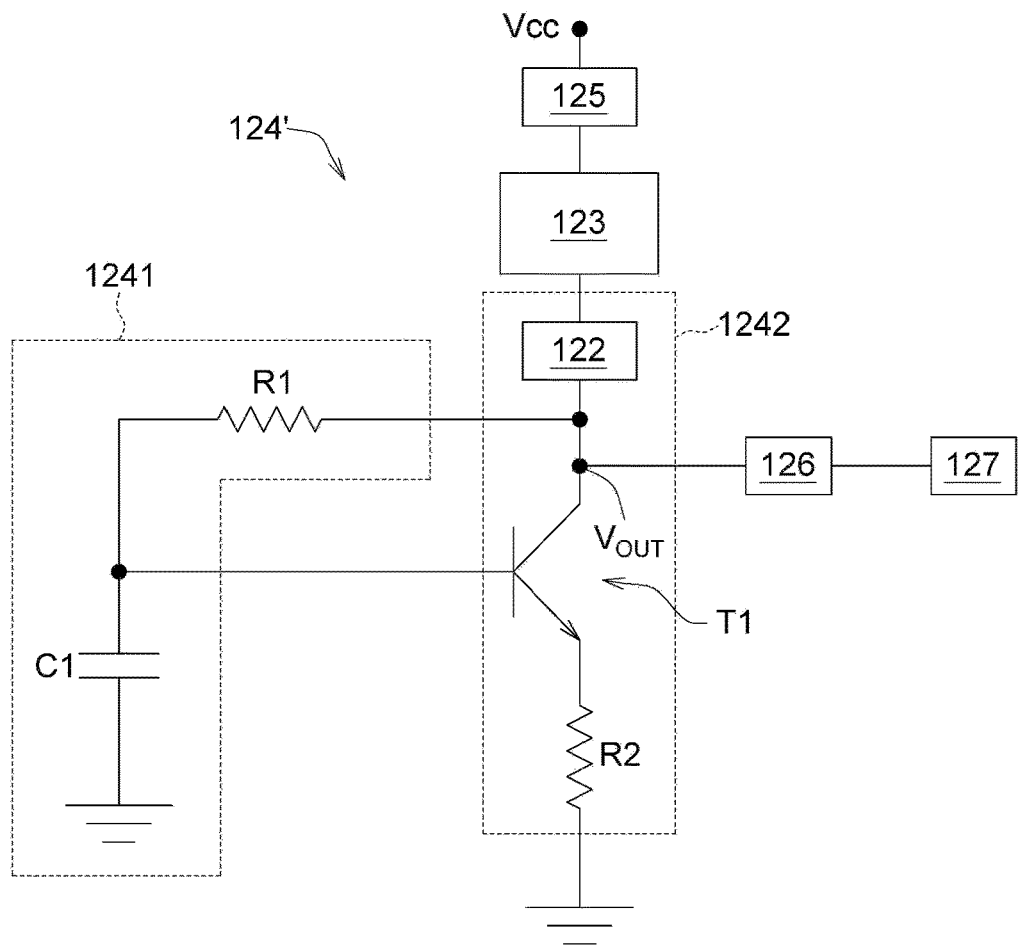
FIG. 4A is a circuit block diagram of a sensing circuit according to another embodiment of the present disclosure.
Figure 4B:
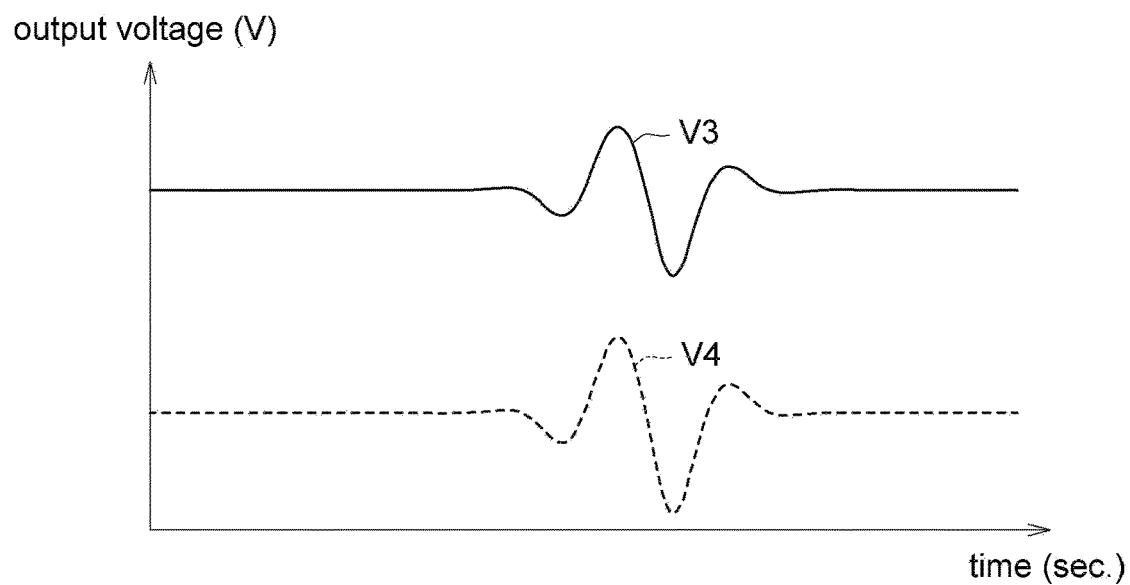
FIG. 4B is a diagram view of relationship curve between the output voltage of the output voltage node of the sensing circuit of FIG. 4A versus time.

Referring to FIGS. 4A and 4B, FIG. 4A is a circuit block diagram of a sensing circuit 124' according to another embodiment of the present disclosure, and FIG. 4B is a diagram view of relationship curve between the output voltage of the output voltage node $V_{OUT}$ of the sensing circuit 124' of FIG. 4A versus time. As shown in FIG. 4A, the sensing circuit 124' includes at least one transistor T1, the feedback circuit 1241 (includes the capacitor C1 and the first resistor R1), the second resistor R2, the control voltage node $V_{CC}$ and the output voltage node $V_{OUT}$. The sensing circuit 124' has the features the same as or similar to that of the aforementioned sensing circuit 124, but it should be noted that the sensing electrode 122 of the sensing circuit 124' is electrically connected to the collector of the transistor T1, and the reference electrode 125 and the control voltage node $V_{CC}$ has common potential. In the present embodiment, the first resistor R1 in FIG. 4A is, for example, 500 KΩ, the capacitor C1 is, for example, 0.2 nF, and the second resistor R2 is, for example, 2 KΩ.

As shown in FIG. 4B, the curve V3 represents the relationship between the output voltage of the output voltage node $V_{OUT}$ versus the time when the first piezoresistive material layer 123 is applied with the reflected signal S2 of 1 MHz has the resistance value of 14.07±1.42 KΩ, and the curve V4 represents the relationship between the output voltage of the output voltage node $V_{OUT}$ versus time when the first piezoresistive material layer 123 is applied with the reflected signal S2 of 1 MHz has the resistance value of 27.58±2.56 KΩ. Different resistance values could simulate a situation where the resistance distribution of the first piezoresistive material layer 123 itself becomes uneven or the thickness of the first piezoresistive material layer 123 becomes uneven when the ultrasonic probe 100 is pressed. As shown in the figure, the trend of the output voltages shown by the curves V3 and V4 is consistent, while it is unrelated to uneven distribution of the resistance of the first piezoresistive material layer 123. It can be seen that the sensing circuit 124' in FIG. 4A could eliminate the influence of the uneven distribution of the resistance value of the first piezoresistive material layer 123, such that the sensed signal (the output voltage of the output voltage node $V_{OUT}$) is almost the reflected signal S2 with high-frequency, and thus it could increase the accuracy of detecting structural information of the to-be-measured object 10.

Figure 5A:
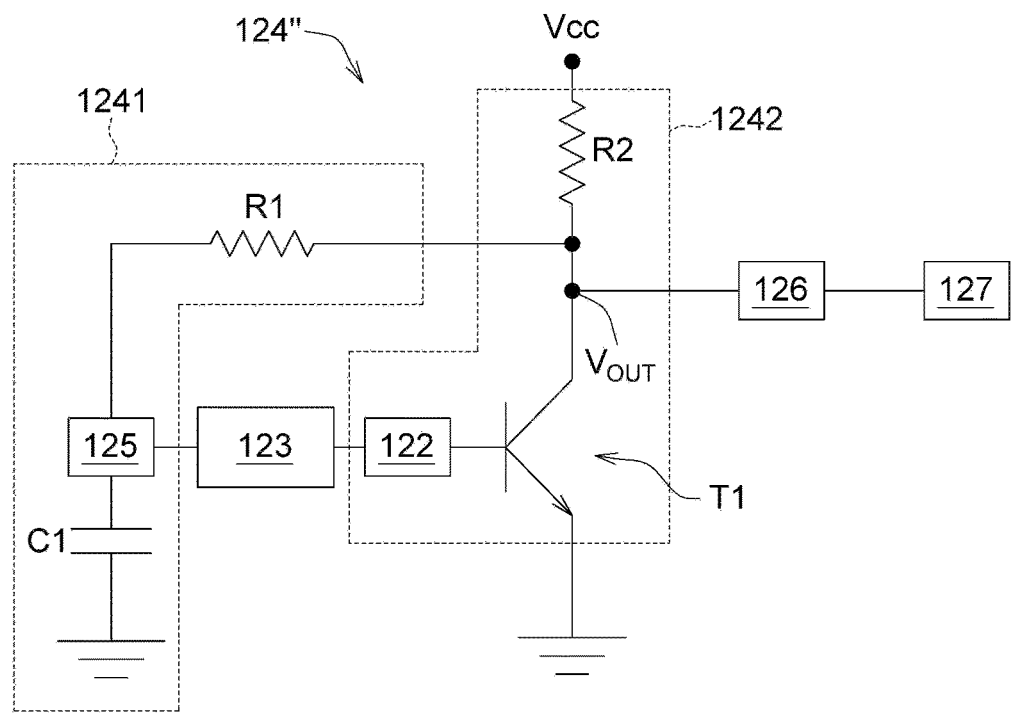
FIG. 5A is a circuit block diagram of a sensing circuit according to another embodiment of the present disclosure.
Figure 5B:
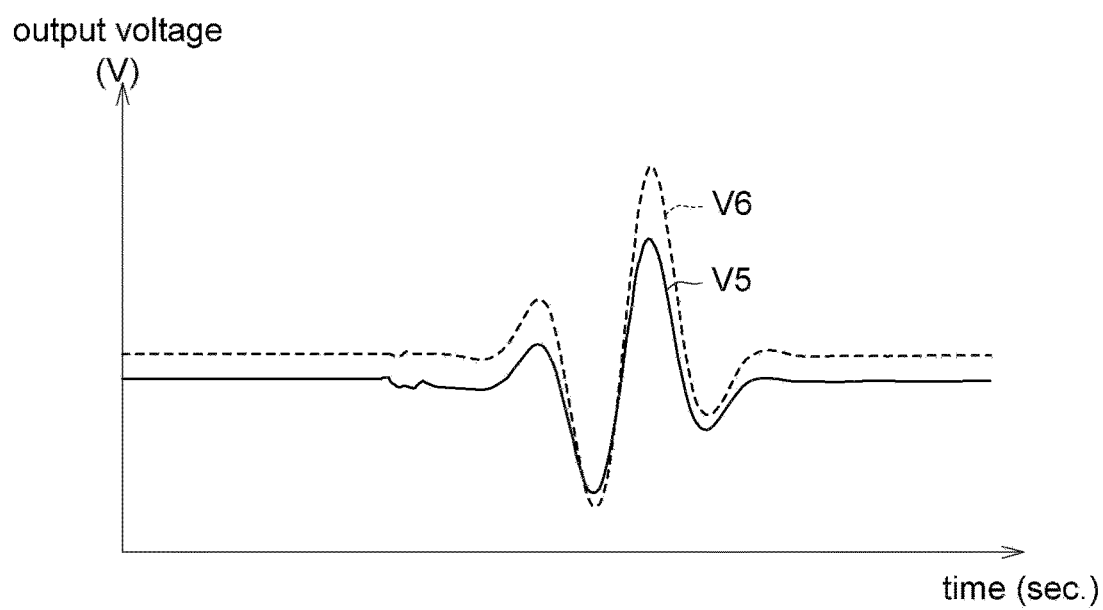
FIG. 5B is a diagram view of relationship curve between the output voltage of the output voltage node of the sensing circuit of FIG. 5A versus time.

Referring to FIGS. 5A and 5B, FIG. 5A is a circuit block diagram of a sensing circuit 124" according to another embodiment of the present disclosure, and FIG. 5B is a diagram view of relationship curve between the output voltage of the output voltage node $V_{OUT}$ of the sensing circuit 124" of FIG. 5A versus time. As shown in FIG. 5A, the sensing circuit 124" includes at least one transistor T1, the feedback circuit 1241 (includes the capacitor C1 and the first resistor R1), the second resistor R2, the control voltage node $V_{CC}$ and the output voltage node $V_{OUT}$. The sensing circuit 124" has the features the same as or similar to that of the aforementioned sensing circuit 124, but it should be noted that the sensing electrode 122 of the sensing circuit 124" is electrically connected to the base of the transistor T1, and the reference electrode 125 is electrically coupled between the capacitor C1 and the first resistor R1. In the present embodiment, the first resistor R1 in FIG. 5A is, for example, 500 KΩ, the capacitor C1 is, for example, 0.2 nF, and the second resistor R2 is, for example, 2 KΩ.

As shown in FIG. 5B, the curve V5 represents the relationship between the output voltage of the output voltage node $V_{OUT}$ and versus time when the first piezoresistive material layer 123 is applied with the reflected signal S2 of 1 MHz has the resistance value of 11.97±0.92 KΩ, and the curve V6 represents the relationship between the output voltage of the output voltage node $V_{OUT}$ versus time when the first piezoresistive material layer 123 is applied with the reflected signal S2 of 1 MHz has the resistance value of 23.95±1.83 KΩ. Different resistance values could simulate a situation where the resistance distribution of the first piezoresistive material layer 123 itself becomes uneven or the thickness of the first piezoresistive material layer 123 becomes uneven when the ultrasonic probe 100 is pressed. As shown in the figure, the trend of the output voltages shown by the curves V5 and V6 is consistent, while it is unrelated to uneven distribution of the resistance of the first piezoresistive material layer 123. It can be seen that the sensing circuit 124" in FIG. 5A could eliminate the influence of the uneven distribution of the resistance value of the first piezoresistive material layer 123, such that the sensed signal (the output voltage of the output voltage node $V_{OUT}$) is almost the reflected signal S2 with high-frequency, and thus it could increase the accuracy of detecting structural information of the to-be-measured object 10.

In an embodiment, the sensing circuits 124, 124' and 124" described in the above embodiments could further include a variable gain amplifier (VGA), an analog-to-digital converter (ADC) and a memory. When the signal sensing module 120 receives pressure wave, the signal sensing module 120 converts the pressure value into the digital signal. As a result, the digital signal could be saved to avoid change of electric potential with time. Since the pressure wave varies with the position or depth of the reflected ultrasound, there will be a very large variation in intensity. In order to make the signals reflected from different depths operate at the same level, an amplifier that could adjust the magnification over time, that is, VGA is needed. The ADC converts the analog signal sent by VGA into the digital signal. Due to the analog signal being not easy to be saved, the signal converted into the digital signal could be saved for subsequent calculation. The memory is configured to store the digital signal converted by the ADC, so that it could be easily accessed at any time when calculation is required. Since the VGA, the ADC, and the memory all could be manufactured by an integrated circuit processes, the VGA, the ADC and the memory, together with the sensing circuit, are adjacently disposed in the same integrated circuit, and it could improve the performance of the signal sensing module 120 and reduce the overall cost.

Although the transistor T1 of the foregoing embodiment is described by using a bipolar transistor as an example, the transistor T1 in another embodiment also could be a metal oxide semiconductor field effect transistor (MOSFET), such as NMOS or PMOS.

Figure 6:
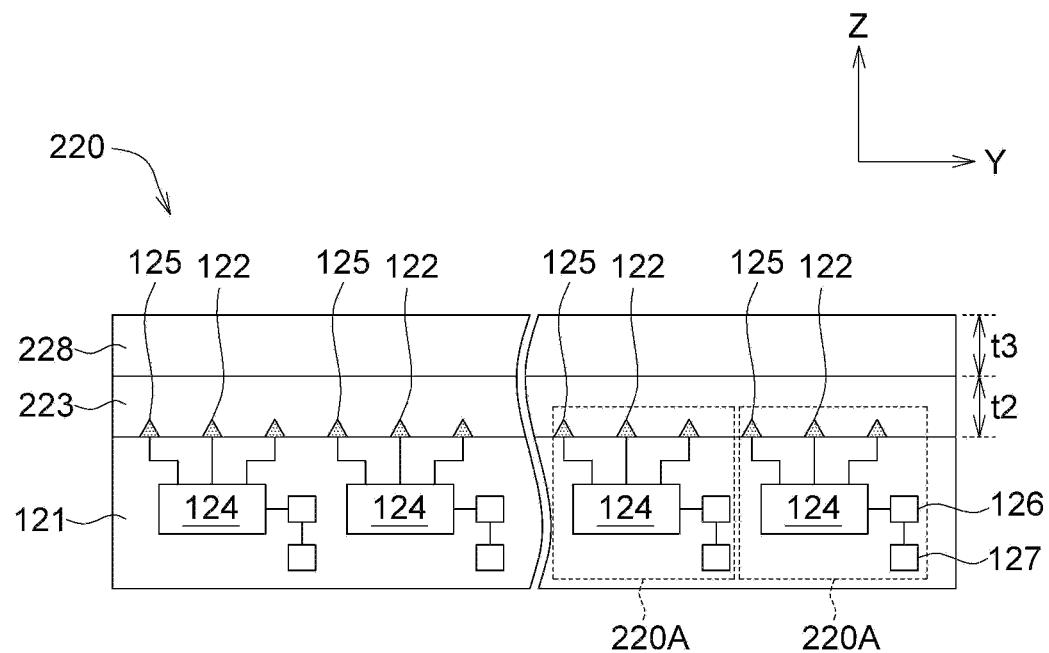
FIG. 6 is a cross-sectional view of a signal sensing module according to another embodiment of the present disclosure.

FIG. 6 is a cross-sectional view of a signal sensing module 220 according to another embodiment of the present disclosure. The signal sensing module 120 of the ultrasonic probe 100 could be replaced by the signal sensing module 220. The signal sensing module 220 includes the substrate 121, at least one sensing electrode 122, a first piezoresistive material layer 223, at least one sensing circuit 124, at least one reference electrode 125, the analog-to-digital converter 126, at least one storage 127 and a second piezoresistive material layer 228. The signal sensing module 220 of the disclosed embodiment has the features same as or similar to that of the signal sensing module 120, but it should be noted that the signal sensing module 220 includes multiple piezoresistive material layers, such as the first piezoresistive material Layer 223 and the second piezoresistive material layer 228. The first piezoresistive material layer 223 could be made of a material the same as or different from that of the second piezoresistive material layer 228.

As shown in FIG. 6, the first piezoresistive material layer 223 is formed between the second piezoresistive material layer 228 and the substrate 121. In an embodiment, the second piezoresistive material layer 228 could directly contact the first piezoresistive material layer 223. The thickness t2 of the first piezoresistive material layer 223 is different from the thickness t3 of the second piezoresistive material layer 228. For example, the thickness t3 of the second piezoresistive material layer 228 is smaller than the thickness t2 of the first piezoresistive material layer 223. In an embodiment, the ratio of the thickness t3 of the second piezoresistive material layer 228 to the thickness t2 of the first piezoresistive material layer 223 is, for example, any value between 0.95 and 0.05 (including the value of end point), such as 0.5, etc. However, in another embodiment, the thickness t3 of the second piezoresistive material layer 228 and the thickness t2 of the first piezoresistive material layer 223 could be substantially the same.

In addition, the resistance value of the second piezoresistive material layer 228 is smaller than the resistance value of the first piezoresistive material layer 223, such that the current path in the first piezoresistive material layer 223 (for example, the simulated current distribution between the simulated sensing electrode 122 and reference electrode 125) extends toward the second piezoresistive material layer 228 with a smaller resistance value to change the current path distribution in the first piezoresistive material layer 223. In detail, through the multiple piezoresistive material layers (for example, the first piezoresistive material layer 223 and the second piezoresistive material layer 227), the current path distribution in the piezoresistive material layers could be changed, so that the current path distribution matches (or conforms to) the direction in which the first piezoresistive material layer 223 is more (or most) sensitive to resistance sensing.

In an embodiment, the first piezoresistive material layer 223 of the signal sensing module 220 could be made of a material the same as that of the first piezoresistive material layer 123 of the signal sensing module 120, and the sum of the thickness t2 of the first piezoresistive material layer 223 of the signal sensing module 220 and the thickness t3 of the second piezoresistive material layer 228 of the signal sensing module 220 is approximately equal to the thickness t1 of the first piezoresistive material layer 123 of the signal sensing module 120, but the current path distribution in the first piezoresistive material layer 223 of the signal sensing module 220 is different from the current path distribution in the first piezoresistive material layer 123 of the signal sensing module 120. In detail, under the circumstances of the same thickness of the piezoresistive material layer (for example, the thickness t1 is equal to the sum of the thicknesses t2 and t3), the current path distribution in the first piezoresistive material layer 223 could be changed through the configuration of the multi-layered piezoresistive material layer, the current path distribution could match (or conform to) the direction in which the first piezoresistive material layer 223 is more (or most) sensitive to resistance sensing. In addition, the embodiments of the present disclosure do not limit the number of the piezoresistive material layers of the signal sensing module, and the number of the piezoresistive material layers could be three or more.

Figure 7:
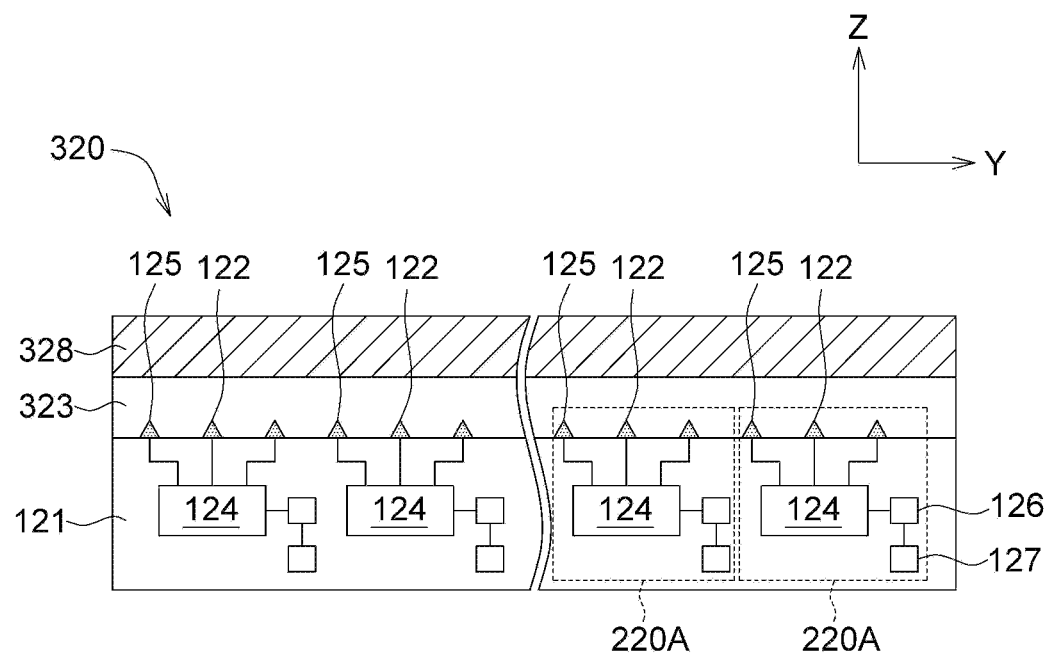
FIG. 7 is a cross-sectional view of a signal sensing module according to another embodiment of the present disclosure.

FIG. 7 is a cross-sectional view of a signal sensing module 320 according to another embodiment of the present disclosure. The signal sensing module 320 includes a substrate 121, at least one sensing electrode 122, a first piezoresistive material layer 323, at least one sensing circuit 124, at least one reference electrode 125, the analog-to-digital converter 126, at least one storage 127 and a conductive layer 328. The signal sensing module 320 of the disclosed embodiment has the features the same as or similar to that of the signal sensing module 120, but it should be noted that the signal sensing module 320 further includes the conductive layer 328.

The first piezoresistive material layer 323 could be made of a material the same as that of the first piezoresistive material layer 123, and similarities will not be repeated here. As shown in FIG. 7, the first piezoresistive material layer 323 is formed between the conductive layer 328 and the substrate 121. In an embodiment, the conductive layer 328 could directly contact the first piezoresistive material layer 323. The resistance value of the conductive layer 328 is smaller than the resistance value of the first piezoresistive material layer 323, so that the current path in the first piezoresistive material layer 323 (for example, the simulated current distribution between the sensing electrode 122 and the reference electrode 125) extends toward the conductive layer 328 with a smaller resistance value, to change the current path distribution in the first piezoresistive material layer 323. In detail, through the conductive layer 328, the current path distribution in the first piezoresistive material layer 323 could be changed, such that the current path distribution in the first piezoresistive material layer 323 matches (or conforms to) the direction in which the first piezoresistive material layer 323 is more (or most) sensitive to resistance sensing. In terms of material, the conductive layer 328 is, for example, a metal layer, such as a copper layer. The conductive layer 328 could be a layer structure formed by semiconductor manufacturing processes (for example, electroplating, printing, coating, or lithography etc.), or the conductive layer 328 also could be a sheet material, which could be disposed on the first piezoresistive material layer 323 by bonding or the like after separately manufactured to be completed.

Figure 8:
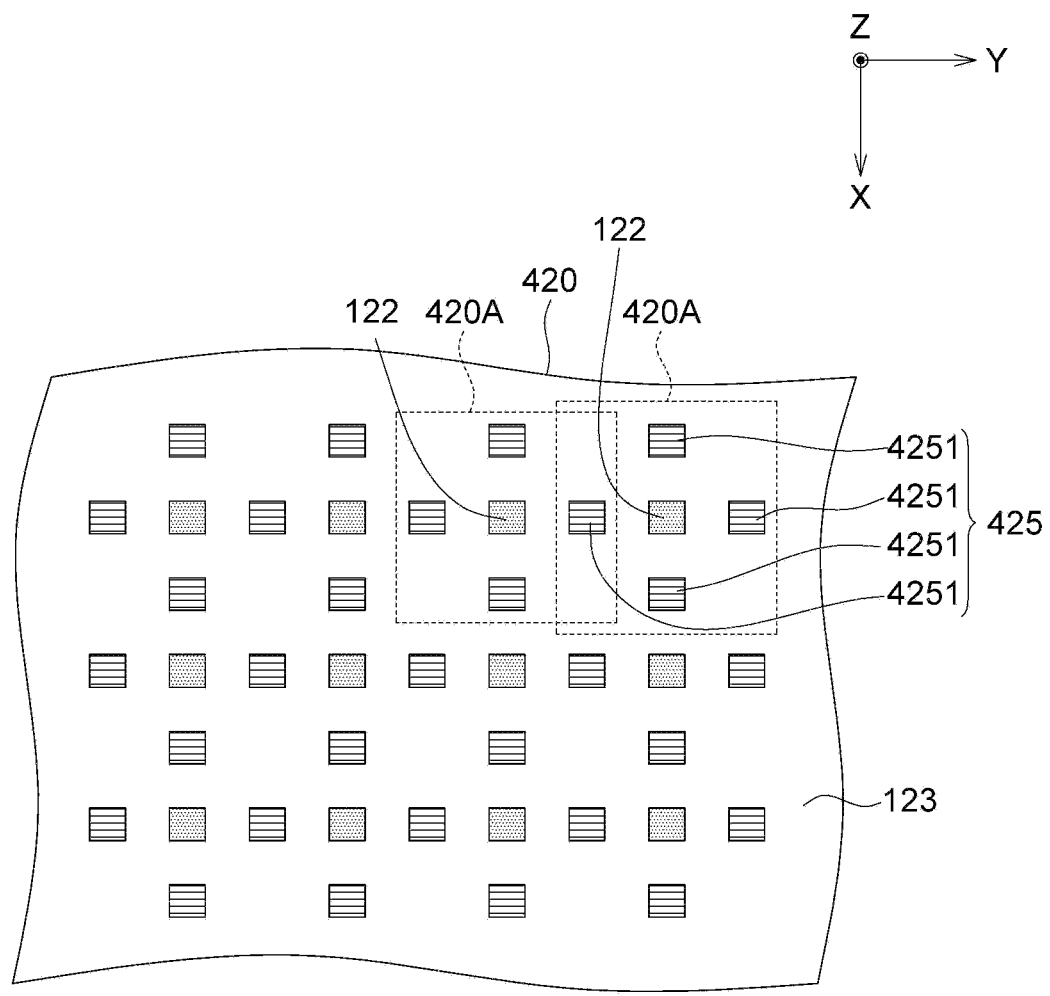
FIG. 8 is a partial schematic diagram of a signal sensing module according to another embodiment of the present disclosure.

FIG. 8 is a partial schematic diagram of a signal sensing module 420 according to another embodiment of the present disclosure. The signal sensing module 420 includes the substrate 121 (not shown), at least one sensing electrode 122, the first piezoresistive material layer 123, at least one sensing circuit 124 (not shown), at least one reference electrode 425, the analog-to-digital converter 126 (not shown) and at least one storage 127 (not shown).

The signal sensing module 420 of the present disclosed embodiment has the features same as or similar to that of the signal sensing module 120. It should be noted that the reference electrode 425 of the signal sensing module 420 includes several sub-reference electrode 4251 which are separately disposed each other, wherein the sub-reference electrodes 4251 surround the sensing electrode 122.

As shown in FIG. 8, the signal sensing module 420 includes a plurality of sensing units 420A, and these sensing units 420A are formed in the substrate 121 (not shown). Each sensing unit 420A includes one sensing electrode 122, one reference electrode 425, one sensing circuit 124 (not shown), one analog-to-digital converter 126 (not shown) and one storage 127 (not shown). In each sensing unit 420A, the sub-reference electrodes 4251 of the reference electrode 425 are disposed separately and surround the sensing electrode 122 to reduce or even avoid the signals of the adjacent two sensing electrodes 122 from interfering with each other. It should be noted that, in this embodiment, the adjacent two sensing units 420A share at least one sub-reference electrode 4251, and the shared sub-reference electrode 4251 and the reference electrode 425 could be together connected to a reference voltage, wherein the reference voltage could be electrical to grounding or to the control voltage node $V_{cc}$, etc., and the similarities will not be repeated here. As shown in FIG. 8, the shared sub-reference electrode 4251 is located between two sensing electrodes 122 of the adjacent two sensing units 420A. In addition, the embodiment of the present disclosure does not limit the number of the shared sub-reference electrodes 4251. As long as the interference from noise to the sensing electrode 122 could be reduced, the number of the shared sub-reference electrodes 4251 could be one or more.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A signal sensing module, comprises:
   a substrate having a surface;
   a sensing electrode disposed on the substrate and exposed from the surface;
   a first piezoresistive material layer formed on the surface and covering the sensing electrode, wherein the first piezoresistive material layer has a resistance value; and
   a sensing circuit disposed on the substrate and configured to sense a change of the resistance value when a pressure wave passes through the first piezoresistive material layer.

2. The signal sensing module as claimed in claim 1, further comprises:
   a reference electrode disposed on the substrate and adjacent to the sensing electrode.

3. The signal sensing module as claimed in claim 2, wherein the reference electrode is shaped into a ring shape, and the reference electrode surrounds the sensing electrode.

4. The signal sensing module as claimed in claim 2, comprising a plurality of the reference electrodes separately disposed each other and surround the sensing electrode.

5. The signal sensing module as claimed in claim 1, further comprising:
   a second piezoresistive material layer;
   wherein the first piezoresistive material layer is formed between the second piezoresistive material layer and the substrate, and a thickness of the first piezoresistive material layer is different from a thickness of the second piezoresistive material layer.

6. The signal sensing module as claimed in claim 5, wherein the thickness of the second piezoresistive material layer is less than the thickness of the first piezoresistive material layer.

7. The signal sensing module as claimed in claim 1, further comprises:
   a second piezoresistive material layer;
   wherein the first piezoresistive material layer is formed between the second piezoresistive material layer and the substrate, and a resistance value of the second piezoresistive material layer is less than a resistance value of the first piezoresistive material layer.

8. The signal sensing module as claimed in claim 1, further comprises:
   a conductive layer;
   wherein the first piezoresistive material layer is formed between the conductive layer and the substrate, and a resistance value of the conductive layer is less than a resistance value of the first piezoresistive material layer.

9. The signal sensing module as claimed in claim 1, wherein the sensing circuit comprises a transistor and a feedback circuit, the feedback circuit comprises a capacitor and a resistor, a terminal of the resistor is coupled to the capacitor and base of the transistor, and another terminal of the resistor is electrically coupled to collector of the transistor.

10. The signal sensing module as claimed in claim 9, wherein the sensing electrode is electrically coupled to emitter of the transistor.

11. The signal sensing module as claimed in claim 9, wherein the sensing electrode is electrically coupled to the collector of the transistor.

12. The signal sensing module as claimed in claim 9, wherein the sensing electrode is electrically coupled to the base of the transistor.

13. The signal sensing module as claimed in claim 1, wherein the signal sensing module is formed by an integrated circuit process, and components of the signal sensing module are arranged in an one-dimensional array or two-dimensional array on the surface of the substrate.

14. An ultrasonic probe, comprises:
    a signal transmitting module configured to emit an ultrasonic signal; and
    a signal sensing module configured to sense reflected signal of the ultrasonic signal reflected from a to-be-measured object, wherein the signal sensing module comprises:
    a substrate having a surface;
    a sensing electrode disposed on the substrate and exposed from the surface;
    a first piezoresistive material layer formed on the surface and covering the sensing electrode, wherein the first piezoresistive material layer has a resistance value; and
    a sensing circuit disposed on the substrate and configured to sense a change of the resistance value when a pressure wave passes through the first piezoresistive material layer.

15. The ultrasonic probe as claimed in claim 14, wherein the signal sensing module further comprises:
    a reference electrode disposed on the substrate and adjacent to the sensing electrode.

16. The ultrasonic probe as claimed in claim 15, wherein the reference electrode is shaped into a ring shape, and the reference electrode surrounds the sensing electrode.

17. The ultrasonic probe as claimed in claim 15, comprising a plurality of the reference electrodes separately disposed each other and surround the sensing electrode.

18. The ultrasonic probe as claimed in claim 14, wherein the signal sensing module further comprising:
    a second piezoresistive material layer;
    wherein the first piezoresistive material layer is formed between the second piezoresistive material layer and the substrate, and a thickness of the first piezoresistive material layer is different from a thickness of the second piezoresistive material layer.

19. The ultrasonic probe as claimed in claim 18, wherein the thickness of the second piezoresistive material layer is less than the thickness of the first piezoresistive material layer.

20. The ultrasonic probe as claimed in claim 14, wherein the signal sensing module further comprises:
  a second piezoresistive material layer;
  wherein the first piezoresistive material layer is formed between the second piezoresistive material layer and the substrate, and a resistance value of the second piezoresistive material layer is less than a resistance value of the first piezoresistive material layer.

21. The ultrasonic probe as claimed in claim 14, wherein the signal sensing module further comprises:
  a conductive layer;
  wherein the first piezoresistive material layer is formed between the conductive layer and the substrate, and a resistance value of the conductive layer is less than a resistance value of the first piezoresistive material layer.

22. The ultrasonic probe as claimed in claim 14, wherein the sensing circuit comprises a transistor and a feedback circuit, the feedback circuit comprises a capacitor and a resistor, a terminal of the resistor is coupled to the capacitor and base of the transistor, and another terminal of the resistor is electrically coupled to collector of the transistor.

23. The ultrasonic probe as claimed in claim 22, wherein the sensing electrode is electrically coupled to one of emitter, the collector, or the base of the transistor.

24. The ultrasonic probe as claimed in claim 14, wherein the signal sensing module is formed by an integrated circuit process, and components of the signal sensing module are arranged in an one-dimensional array or two-dimensional array on the surface of the substrate.

* * * * *